June 17, 1941.     H. WAGNER ET AL     2,246,116
AIRPLANE WING STRUCTURE
Filed Oct. 27, 1938     4 Sheets-Sheet 3

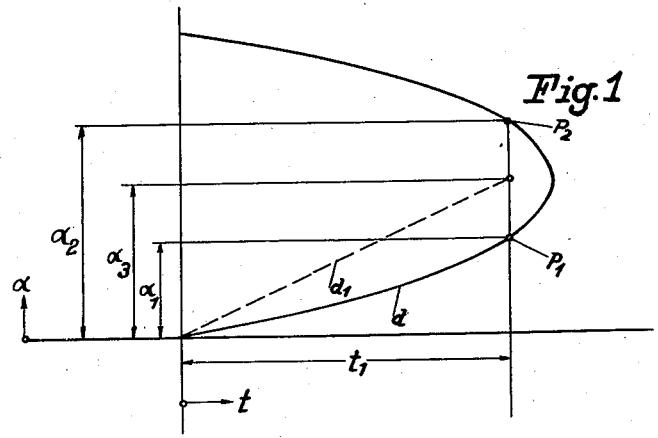
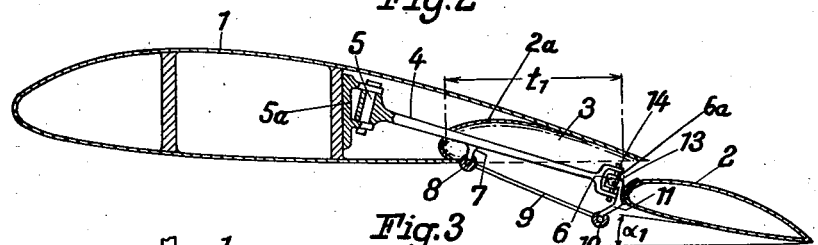
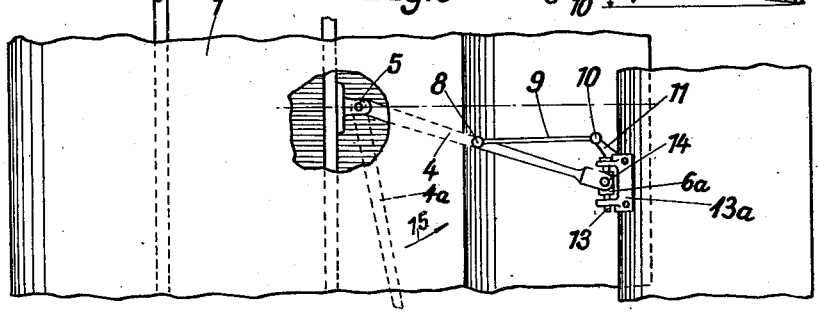
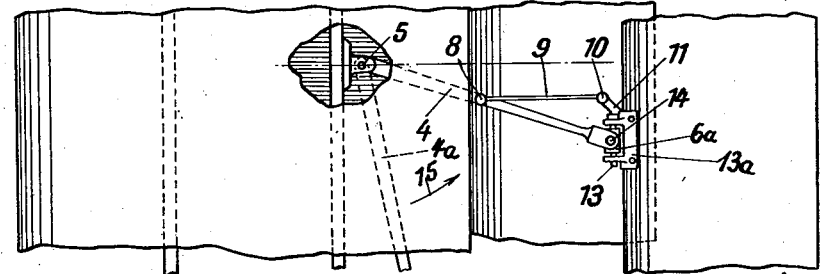

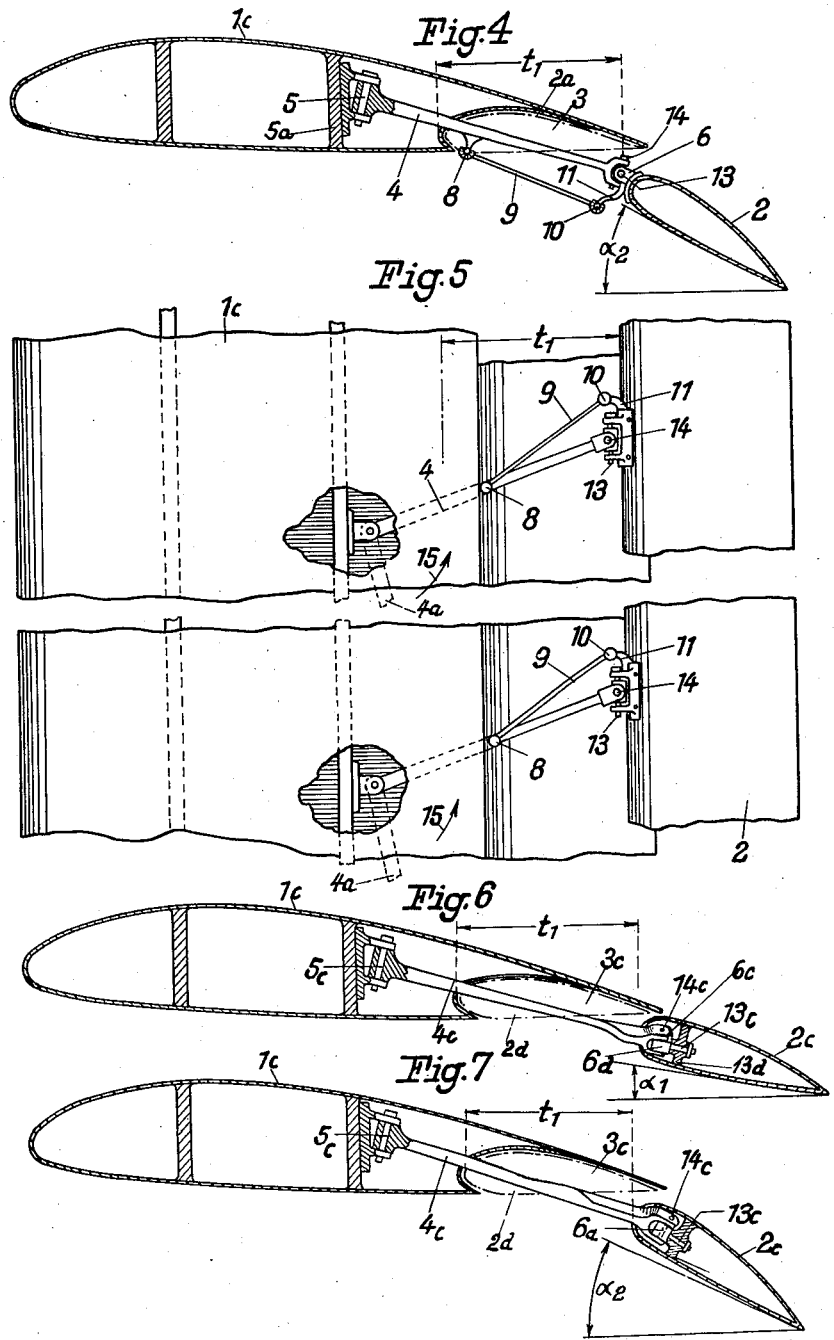

Inventors:
Herbert Wagner
Franz Villinger
by J. S. Baldwin
Atty

June 17, 1941.  H. WAGNER ET AL  2,246,116

AIRPLANE WING STRUCTURE

Filed Oct. 27, 1938  4 Sheets-Sheet 4

Inventors:
Herbert Wagner
Franz Villinger
by J. S. Baldwin

Patented June 17, 1941

2,246,116

UNITED STATES PATENT OFFICE 2,246,116

AIRPLANE WING STRUCTURE

Herbert Wagner and Franz Villinger, Dessau, Germany, assignors to Junkers Flugzeug-und-Motorenwerke Aktiengesellschaft, Dessau, Germany, a corporation of Germany Application October 27, 1938, Serial No. 237,250
In Germany October 28, 1937

10 Claims. (Cl. 244—42)

This invention relates to improvements in airplane wing structures, and refers to an improved form of construction wherein a main wing is provided with an auxiliary wing adjustably mounted thereon so that the depth—from front to rear—of the wing structure may be varied by moving the auxiliary wing rearwardly, and wherein simultaneously with this rearward movement the auxiliary wing is also turned to a downward and rearward inclination thereby changing the pitch of the wing. By "pitch" we mean the inclination of the underside of the wing in the direction to the axis of the airplane propeller, or in other words, the angle of incidence.

In wing structures of this type which have been made heretofore it has been customary to utilize means for adjustably mounting the auxiliary wing upon the main wing so that as the former is moved rearwardly it is also moved at a uniform speed to an ever increasing pitch or inclination in a downward and rearward direction, in other words as the auxiliary wing is moved rearwardly its pitch increases correspondingly. Thus when the auxiliary wing has been moved to its rearmost position its pitch is greatest, and the only way to lessen the pitch is to move the auxiliary wing in a forward direction. However for both starting and landing, while it is very desirable that the auxiliary wing be substantially in its rearmost position, different pitches are desirable. A lesser pitch is required for starting in order to afford lifting capacity with a minimum of wind resistance, while a greater pitch is better for landing in order to provide both lifting and braking capacity, the latter to decelerate the plane in as short a distance as possible.

It is an object of this invention to provide a wing structure consisting of a main wing and an auxiliary wing wherein means are provided for adjustably supporting the latter so that through movement of the said means the wing is moved both rearwardly and also into an inclined position to increase its pitch; and wherein the means are so arranged that the pitch is materially changed by only very slight longitudinal movement of the auxiliary wing when the later is adjacent its rearmost position. Thus we aim to provide an arrangement whereby the most favorable pitches for both starting and landing may be obtained with the auxiliary wing located adjacent its rearmost position.

Another object of the invention is to provide such a wing structure wherein the means for adjustably supporting the auxiliary wing from the main wing are so arranged that the auxiliary wing may be disposed at either of two inclinations, or pitches, when located at any one of a number of given distances from, and adjacent to, its rearmost position.

A further object of the invention is to provide a wing structure having the aforementioned characteristics and advantages which is light in weight, simple in construction, and easy to operate.

We will now proceed to describe two preferred embodiments of the invention in detail with the aid of the accompanying drawings, in which:

Figure 1 is a diagram showing the relation between the rearward movement of the auxiliary wing and its pitch.

Figure 2 is a longitudinal section showing a main wing and an auxiliary wing adjustably mounted thereon; the latter being in its preferred position for starting, hereinafter referred to as its starting position.

Figure 3 is a partial inverted plan of Figure 2.

Figure 4 is a longitudinal section similar to that shown in Figure 2, but with the auxiliary wing in its preferred position for landing, hereinafter referred to as its landing position.

Figure 5 is a partial inverted plan of Figure 4.

Figure 6 is a longitudinal section of a main wing and an auxiliary wing showing a modified means for supporting the latter adjustably from the former; the auxiliary wing being shown in starting position.

Figure 7 is a longitudinal section similar to Figure 6, but with the auxiliary wing in landing position.

Figure 8:
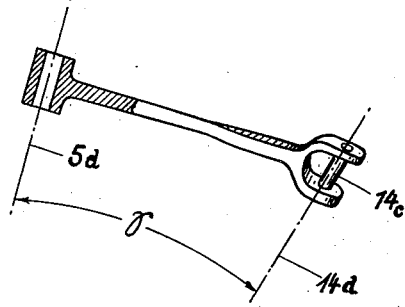
Figure 8 is a detail, showing the pivot arm employed in the modification shown in Figures 6 and 7, partly in side elevation and partly in section.

Referring first to Figures 2 to 5. I designates a main wing having a recess 3 formed transversely in its rear side to receive the auxiliary wing 2 when the latter is in its normal flying position indicated at 2a in Figures 2 and 4. Supported in suitable bearings 5a on the main wing 1, and in transverse alignment with one another, are a plurality of pins 5 which, in the present instance, are downwardly and forwardly inclined. Mounted for rotation upon each pin 5 is a pivot arm 4; these arms lie in the positions indicated at 4a when the auxiliary wing 2 is located at its position 2a for normal flight. At the outer extremity of each pivot arm 4 a pin 14 is rotatably mounted therein and forms a portion of a universal joint 6 connected also to the auxiliary wing 2. The pivot arms 4, which may be turned about their pins 5 in any preferred manner (not shown), are parallel to one another in all positions and retain the front transverse margin of the auxiliary wing 2 in parallel relation with the opposed transverse face of the recess 3 in the main wing 1.

Formed on each pivot arm 4 intermediately of its length is a laterally disposed boss 7 to which one extremity of a link 9 is connected by means of a universal connection 8. A second universal connection 10 on the opposite extremity of each link 9 is also secured to a lug 11 which projects from and is rigidly connected to the auxiliary wing 2 and extends beneath the universal joint 6.

Each pin 14, which is rotatably mounted in one extremity of one of the pivot arms 4, pivotally secures the latter to the body 6a of one universal joint 6, and another pin 13 which projects from each body 6a is rotatably mounted in a bracket 13a secured to the auxiliary wing 2.

It will therefore be seen that as the pivot arms 4 turn about the pins 5 from their normal flight positions 4a in the direction of the arrows 15, the distance between the axes of the pins 5 and the axes of the universal connection 10 reduces, and, since the lugs 11 are located beneath the universal joints 6 it follows that the pitch of the auxiliary wing 2 increases. Moreover this reduction in distance occurs with increasing rapidity as the pivot arms 4 approach and cross their rear positions, that is when they lie at right angles to the opopsed transverse faces of the recess 3 and the auxiliary wing 2. Again this reduction in distance continues to occur after the pivot arms 4 have passed their rear positions, as above defined, and consequently two entirely different pitches are obtained with the rods 4 on opposite sides of, but at the same inclination to, their said rear positions.

Referring both to the diagram shown in Figure 1 and also to Figures 2 and 4, the line $d$ in Figure 1 denotes the increase in pitch as the wing 2 is moved rearwardly in the direction of the arrow 15 from its normal flight position and again forwardly past the defined rear positions of the pivot arms 4. With the aid of the diagram it becomes readily apparent that in starting position, shown in Figures 2 and 3 and at $P_1$ in the diagram, the distance $t_1$ which the auxiliary wing 2 has been moved rearwardly is the same as the distance $t_1$ in Figures 4 and 5 when the said wing 2 is in landing position. However, due to the fact that the pivot arms 4 have moved past their rear positions, as defined, in the latter case the pitch has become the angle $\alpha_2$ whereas in the starting position the pitch was only the angle $\alpha_1$. $P_2$ in the diagram denotes the landing position on the pitch increase line $d$. The purpose of the line $d_1$ on the diagram is to illustrate a rate of pitch increase that might occur if the pitch increased uniformly with the rearward movement of the auxiliary wing, from which it may be seen that such variations of pitch as now occur could not be obtained with the wing in substantially its rear position.

In the modified arrangement shown in Figures 6 to 13, and now to be described, the diagram given in Figure 1 also applies though the movement is obtained by a somewhat varied arrangement.

The auxiliary wing 2c is again supported from the main wing 1c by pivot arms 4c each mounted for rotation about a fixed axis 5d upon a pin 5c supported upon the said main wing. When the wing 2c is in normal flight position 2d it is located in the recess 3c. The extremities of the pivot arms 4c remote from the pins 5c are also again connected to the auxiliary wing 2c by universal joints 6c.

Each universal joint 6c consists of a pin 14c which is rotatably mounted in one extremities of one of the pivot arms 4c. This pin 14c projects through a body 6d from which a second pin 13c extends, and the latter is rotatably mounted in a bearing 13d carried by the auxiliary wing 2c. The axis of the pin 13c is supported by its bearing substantially in alignment with a chord of the auxiliary wing profile extending from the front towards the rear of the latter.

Figure 9:
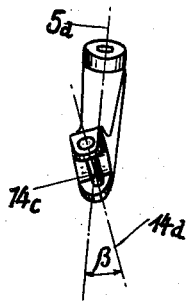
Figure 9 is a front elevation of the pivot arm shown in Figure 8.
Figure 10:
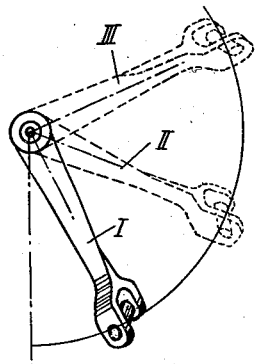
Figure 10 is an elevation of the same pivot arm in the direction of the arrow $a$ in Figure 8; the normal flight position being shown at I, and the starting and landing positions being indicated at II and III respectively.
Figure 11:
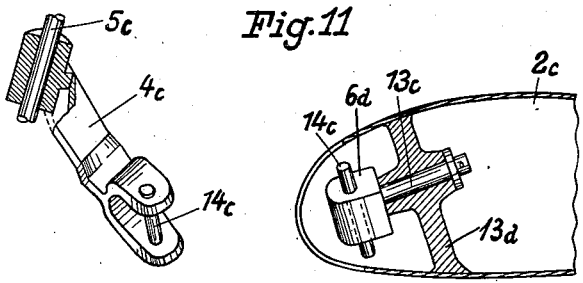
Figure 11 is a disassembled view, partly in section, of the pivot arm used in the modification shown in Figures 6 and 7, and the universal joint mounted upon the auxiliary wing, and their inclination to one another when in normal flight.
Figure 12:
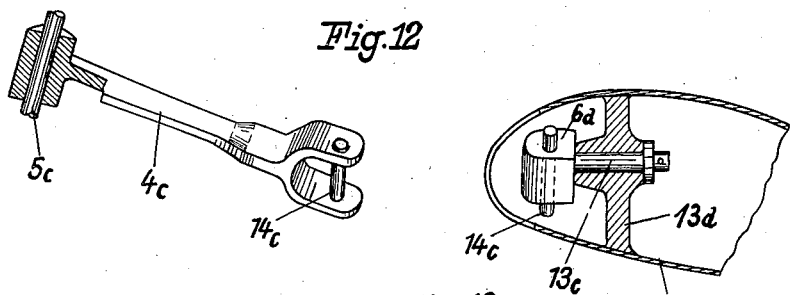
Figure 12 is a disassembled view, partly in section, similar to that shown in Figure 11, but with the pivot arm and universal joint in the relative positions they assume when the auxiliary wing is in starting position.
Figure 13:
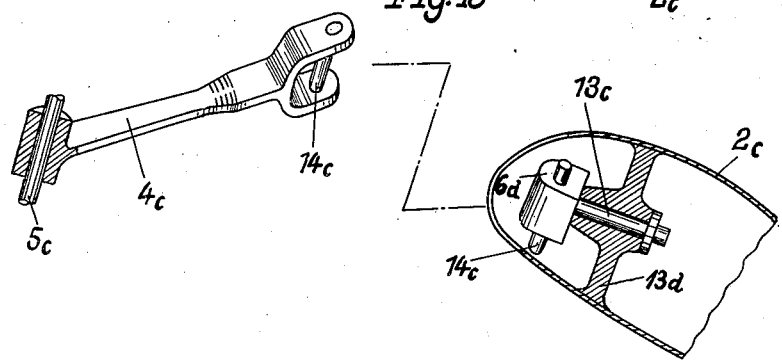
Figure 13 is another disassembled view, partly in section, similar to that shown in Figure 11, but showing the relative positions of the pivot arm and universal joint when the auxiliary wing is in landing position.

In the side elevation of one of the pivot arms 4c shown in Figure 8 it is shown that the axes 5d and 14d are inclined to one another at an angle $\gamma$, and also from the front elevation of one of the pivot arms shown in Figure 9 it is apparent that in a second plane these axes 5d and 14d are inclined at an angle $\beta$. Due to the compound angle formed by the angles $\gamma$ and $\beta$ these two axes 5d and 14d never intersect, and in consequence as the arms 4c turn about their axes 5d the resultant increasing pitch follows the curved path $d$ shown in the diagram (Figure 1). The resultant action of the compound angle above described causes the outer extremity of the pivot arm 4c and the pin 14c shown in Figures 11, 12 and 13 to assume their positions therein shown and thereby turn the pin 13c downwardly and rearwardly as the said arm swings from its normal flight position shown in Figure 11. Figure 10 also shows the pivot arm 4c in normal flight position I, and also indicates the position of the arm in both starting and landing positions indicated at II and III respectively. From the above it becomes apparent that the pitch angles $\alpha_1$ and $\alpha_2$ are again both obtained with the auxiliary wing 2c located the distance $t_1$ from its normal flight position 2d.

While in the foregoing the preferred embodiments of the invention have been described and shown it is understood that further alterations and modifications may be made therein so long as the said alterations and modifications fall within the scope of the appended claims.

What we claim is:

1. An airplane wing structure comprising a main wing, an auxiliary wing adapted to be moved rearwardly therefrom, a plurality of arms each pivoted at one extremity on the main wing, a pin extending through the opposite extremity of each arm, the axes of the pivoted extremity of each arm and of the pin extending through the opposite extremity of the latter being angularly disposed in two directions so that the said axes produced never intersect, bearings carried by the auxiliary wing, another pin in each bearing, a body from which each other pin projects, and one of the first named pins extending through each body whereby pivotal movement of the arms about their axes on the main wing is adapted to move the auxiliary wing rearwardly and to progressively increase the pitch of said auxiliary wing until the latter reaches it rear position, and whereby continued movement of the arms after said rear position is reached continues to increase the pitch of the auxiliary wing.

2. An airplane wing structure comprising a main wing having a recess formed in its rear side, an auxiliary wing adapted to rest in said recess and to be moved rearwardly therefrom, pivot arms mounted on the main wing, an arm pivotally mounted at one extremity on each pivot means, a pin extending through the opposite extremity of each arm, a body through which each pin extends for rotary movement therein, another pin extending from each body and integral therewith, and a bearing on the auxiliary wing in which each other pin is rotatably mounted, the axes of the pivot means at one extremity of each arm and of the pin extending through the opposite extremity of the latter being angularly disposed to one another in two directions so that the said axes when produced never intersect, and whereby pivotal movement of the arms moving the auxiliary wing from said recess increases the pitch of the auxiliary wing both until the rear position of the latter has been reached and after the said rear position has been passed, thereby permitting said auxiliary wing to be set at two different pitches at the same rearward distance from the main wing.

3. An airplane wing structure comprising a main wing, an auxiliary wing adapted to be moved rearwardly relative thereto, a pivot arm, means on the main wing supporting the pivot arm for rotation about a fixed axis means connecting said pivot arm to said auxiliary wing, and angular control means connected to said pivot arm and to said auxiliary wing whereby the pitch of the latter is increased as said pivot arm is moved rearwardly to and through its position rectangular of the trailing edge of the main wing so that the auxiliary wing may be set at two different pitches at the same rearward distance from the main wing.

4. An airplane wing structure comprising a main wing having a recess formed in its rear side, an auxiliary wing adapted to rest in said recess and to be moved rearwardly therefrom, transversely aligned pivot means on the main wing, pivot arms mounted thereon which remain parallel to one another at all times, an angular control means connecting said arms to the auxiliary wing whereby the pitch of the latter is progressively increased as said auxiliary wing is moved from said recess by movement of the pivot arms until the auxiliary wing reaches its rear position, and whereby upon continued movement of the pivot arms the pitch continues to increase after said rear position has been passed.

5. An airplane wing structure comprising a main wing, an auxiliary wing adapted to be moved rearwardly relative thereto, a pivot arm, means on the main wing supporting the pivot arm for rotation about a fixed axis, a universal joint connecting the pivot arm with the auxiliary wing, and angular control mechanism for said universal joint comprising a fixed lug extending from the auxiliary wing, a laterally disposed boss carried by the pivot arm, a link, and a universal connection on each extremity of the link, one of said connections being secured to said boss and the other to said lug.

6. A wing structure comprising the combination of a main wing and an auxiliary wing, the latter being connected to the main wing by a pivot arm, said pivot arm being movable beyond its position rectangular relative to the trailing edge of the main wing, and means for continuously varying in the same direction the angle of incidence or pitch of the auxiliary wing during the entire movement of the pivot arm.

7. Wing structure comprising a main wing, parallel arms independently pivoted to the main wing for swinging movement across transverse wing axes passing through the respective pivot points, an auxiliary wing connected to the free ends of said arms for universal movement thereabout, and means connecting said arms and said auxiliary wing so constructed and arranged that swinging movement of said arms in one direction varies the angle of incidence of said auxiliary wing continuously in the same direction throughout the entire arc of swinging movement of said arms.

8. An airplane wing structure comprising a main wing, an auxiliary wing adapted to be moved rearwardly with reference thereto, a pivot arm, means on the main wing supporting the pivot arm for rotation about a fixed axis, universal joints connecting the pivot arm with the auxiliary wing, and control means extending from said arm to the auxiliary wing and connected through a universal joint to the latter at a point spaced laterally from the pivotal connection between said arm and auxiliary wing whereby movement of said pivot arm past its rearmost position obtains continued movement of the auxiliary wing in the same direction to vary the pitch thereof.

9. An airplane wing structure comprising a main wing, an auxiliary wing adapted to be moved rearwardly with reference thereto, pivot arms, means on the main wing supporting the pivot arms for rotation about fixed axes, universal joints connecting the pivot arms with the auxiliary wing, and means associated with each arm and the auxiliary wing cooperable on continuous movement of said arms in the same direction to obtain continuous movement of said auxiliary wing about an axis parallel to its longitudinal edge and thereby vary the pitch of said auxiliary wing during the entire swinging movement of said arms.

10. An airplane wing structure comprising a main wing, arms pivoted thereon for swinging through substantially 180 degrees about aligned axes, an auxiliary wing, means connecting said auxiliary wing to the free ends of said arms for universal movement with reference thereto, and means associated with each arm cooperable with the universal mounting of the auxiliary wing thereon to continuously rotate said auxiliary wing in the same direction about an axis parallel to its longitudinal axis throughout the entire swinging movement of said arms whereby the pitch of said auxiliary wing is varied continuously in one direction during movement of the pivot arms in one direction.

HERBERT WAGNER.
FRANZ VILLINGER.